US008843977B2

(12) United States Patent
Ruffini et al.

(10) Patent No.: US 8,843,977 B2
(45) Date of Patent: Sep. 23, 2014

(54) MEDIA CONTENT DELIVERY SYSTEMS AND METHODS

(75) Inventors: Michael P. Ruffini, Methuen, MA (US); Harpal S. Bassali, San Francisco, CA (US); John K Trimper, Groton, MA (US); Armando P Stettner, Westford, MA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 624 days.

(21) Appl. No.: 12/478,255

(22) Filed: Jun. 4, 2009

(65) Prior Publication Data

US 2010/0313233 A1    Dec. 9, 2010

(51) Int. Cl.
*H04N 7/18* (2006.01)
*H04N 7/173* (2011.01)
*H04N 21/433* (2011.01)
*H04N 21/2747* (2011.01)
*H04N 21/6377* (2011.01)
*H04N 21/458* (2011.01)

(52) U.S. Cl.
CPC ........ *H04N 7/17318* (2013.01); *H04N 21/4334* (2013.01); *H04N 21/2747* (2013.01); *H04N 21/6377* (2013.01); *H04N 21/4583* (2013.01)
USPC .................. 725/93; 725/82; 725/102; 725/94

(58) Field of Classification Search
None
See application file for complete search history.

(56) References Cited

U.S. PATENT DOCUMENTS

| | | | |
|---|---|---|---|
| 6,014,694 A * | 1/2000 | Aharoni et al. | 709/219 |
| 8,006,275 B1 * | 8/2011 | Poole et al. | 725/96 |
| 2004/0111756 A1 * | 6/2004 | Stuckman et al. | 725/142 |
| 2006/0035610 A1 | 2/2006 | Potrebic | |
| 2006/0159166 A1 * | 7/2006 | Mohsenian | 375/240.03 |
| 2006/0238809 A1 | 10/2006 | Suzuki | |
| 2008/0209491 A1 | 8/2008 | Hasek | |
| 2008/0244660 A1 | 10/2008 | Wodka et al. | |
| 2009/0007199 A1 | 1/2009 | La Joie | |
| 2009/0013362 A1 | 1/2009 | Liu et al. | |
| 2009/0106802 A1 | 4/2009 | Zuckerman et al. | |
| 2009/0217332 A1 * | 8/2009 | Hindle et al. | 725/109 |
| 2010/0319026 A1 * | 12/2010 | Ellis et al. | 725/40 |
| 2011/0219064 A1 * | 9/2011 | Kawamura et al. | 709/203 |

* cited by examiner

*Primary Examiner* — Nathan Flynn
*Assistant Examiner* — Omar S Parra

(57) ABSTRACT

An exemplary method includes receiving, by a media content delivery subsystem from an end-user media content processing device via a network, a request to record a live transmission of a media content instance, recording, by the media content delivery subsystem, the live transmission of the media content instance, and transmitting, by the media content delivery subsystem, data representative of the recorded live transmission of the media content instance to the end-user media content processing device via the network for local storage by the end-user media content processing device. In certain embodiments, the recording includes generating at least one media data file containing the data representative of the recorded live transmission of the media content instance, and the transmitting includes transferring the at least one media data file from the media content delivery subsystem to the end-user media content processing device via the network.

21 Claims, 7 Drawing Sheets

MEDIA CONTENT DELIVERY SYSTEMS AND METHODS

BACKGROUND INFORMATION

The set-top box ("STB") has become an important device for end users (e.g., subscribers) who access media content services and the media content within those services. It is not uncommon for an STB to include or to be used in conjunction with digital video recording ("DVR") technology, which may be used to record streamed media content to permanent storage (e.g., a hard disk) at an end user's premises for subsequent local access and playback.

A common problem experienced by users of traditional DVR technology is that of recording failures, which may have various causes. For example, an end user may set a recording schedule that configures an end-user device to locally record certain media content streams during scheduled transmissions of the media content streams. However, at the scheduled transmission times, sufficient network and/or local resources may not be available to receive and/or record the media content streams. As an example, sufficient network bandwidth may not be available to support concurrent transmissions of the media content streams to the end-user device. As another example, the end-user device may lack resources (e.g., tuners) to concurrently receive and/or record the media content streams. Typically, such a lack of resources causes at least one of the conflicting media content streams scheduled for recording to not be recorded.

BRIEF DESCRIPTION OF THE DRAWINGS

The accompanying drawings illustrate various embodiments and are part of the specification. The illustrated embodiments are merely examples and do not limit the scope of the disclosure. Throughout the drawings, identical reference numbers designate identical or similar elements.

DETAILED DESCRIPTION OF PREFERRED EMBODIMENTS

Figure 1:
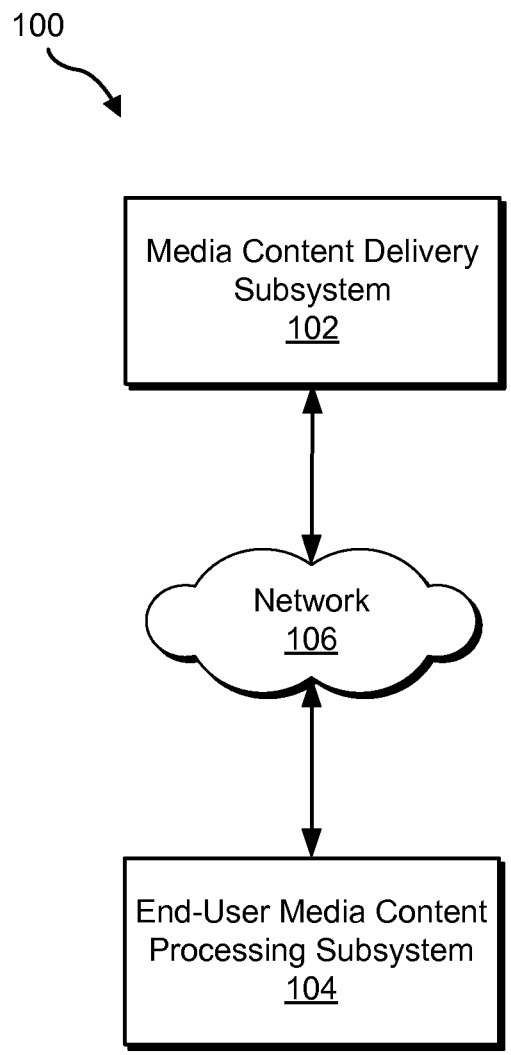
FIG. 1 illustrates an exemplary media content delivery system.

Exemplary media content delivery systems, methods, and apparatuses are disclosed herein. As described in more detail below, in certain exemplary embodiments, a media content delivery subsystem may receive, from an end-user media content processing device via a network, a request to record a live transmission of a media content instance. The media content delivery subsystem may record the live transmission of the media content instance and transmit data representative of the recorded live transmission of the media content instance to the end-user media content processing device via the network for local storage by the end-user media content processing device. In certain examples, the transmission of data representative of the recorded live transmission of the media content instance to the end-user media content processing device may utilize less resources (e.g., resources of the network such as network bandwidth and/or resources of the end-user media content processing device such as tuners) than are or would be utilized by the live transmission of the media content instance (e.g., live transmission of the media content instance to the end-user media content processing device via the network). In certain examples, the recording may include generating at least one media data file containing the data representative of the recorded live transmission of the media content instance, and the transmitting may include transferring the at least one media data file from the media content delivery subsystem to the end-user media content processing device via the network.

In certain exemplary embodiments, an end-user media content processing device may transmit, to a media content delivery subsystem via a network, a request to record a live transmission of a media content instance over the network. The end-user media content processing device may receive, in response to the request, data representative of a network-recorded live transmission of the media content instance. The end-user media content processing device may store the data representative of the network-recorded live transmission of the media content instance to a local storage device and utilize the data representative of the network-recorded live transmission of the media content instance in the local storage device to play back at least a portion of the media content instance for experiencing by a user.

Other exemplary media content delivery systems, methods, and apparatuses are also disclosed herein.

As used herein, the term "media content" may refer generally to any content made accessible by a media content delivery subsystem to one or more end-user media content processing devices via a network. The term "media content instance" as used herein may refer generally to any television program, on-demand media program, pay-per-view media program, broadcast media program (e.g., broadcast television program), multicast media program, narrowcast media program, IPTV content, commercial, advertisement, video, movie, song, or any segment, component, or combination of these or other forms of media content that may be viewed or otherwise experienced by a user. In certain embodiments, a media content instance may include a television program that is configured to be transmitted (e.g., broadcast, multicast, or narrowcast) to at least one end-user media content processing device during a scheduled transmission time slot.

The term "live transmission" or "live transmission format" as used herein may refer generally to a streaming of media content over a network to at least one end-user media content processing device in a manner that enables the end-user media content processing device to begin presenting (e.g., playing back) a media content instance carried by the live transmission without having to first download the entire media content instance. For example, a broadcast, multicast, or narrowcast television program may be streamed to an end-user media content processing device in a live transmission and presented by the end-user media content processing device for experiencing by an end user while the broadcast, multicast, or narrowcast is in process.

The term "non-live transmission" or "non-live transmission format" as used herein may refer generally to a transfer of data representative of media content over a network to at least one end-user media content processing device in a manner that generally does not enable the end-user media content processing device to begin presenting the media content without first downloading the media content in its entirety, or in a manner that does not enable the end-user media content processing device to play back the media content at the same rate at which a live transmission of the media content is transmitted. For example, a non-live transmission of a media content instance may include a file transfer, which may include a transfer of data representative of media content (e.g., one or more media data files) over the network at a rate that is lower than a rate at which a live transmission of the media content instance is transmitted. Non-live transmission of media content could also include a transfer of data representative of media (e.g. one or more media data files) over a network at a rate that is higher than a rate at which a live transmission of the media content instance is transmitted, during off-peak usage times when network resources are available.

Components and functions of exemplary media content delivery systems, methods, and apparatuses will now be described in more detail in reference to the drawings.

FIG. 1 illustrates an exemplary media content delivery system 100 (or simply "system 100"). System 100 may include a media content delivery subsystem 102 and an end-user media content processing subsystem 104 in communication with one another via a network 106. As described herein, media content delivery subsystem 102 may be configured to deliver media content to end-user media content processing subsystem 104 in multiple transmission formats, including a live transmission format and a non-live transmission format. The non-live transmission format may generally utilize less network resources and/or less end-user device resources than the live transmission format. As described in more detail further below, in certain embodiments, the non-live transmission format may include a media file transfer (e.g., a file download of at least one media data file created from a recording of a live transmission of a media content instance) from media content delivery subsystem 102 to end-user media content processing subsystem 104 via network 106.

In certain embodiments, system 100 or one or more components of system 100 may include any computer hardware and/or computer-implemented instructions (e.g., software), or combinations of computer-implemented instructions and hardware, configured to perform one or more of the processes described herein. In particular, it should be understood that components of system 100 may be implemented on one physical computing device or may be implemented on more than one physical computing device. Accordingly, components of system 100 may include any one of a number of computing devices, and may employ any one of a number of computer operating systems.

Accordingly, one or more of the processes described herein may be implemented at least in part as instructions executable by one or more computing devices. In general, a processor (e.g., a microprocessor) receives instructions, from a computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other medium from which a computer can read.

End-user media content processing subsystem 104 and media content delivery subsystem 102 may communicate over network 106 using any communication platforms and technologies suitable for transporting media content and/or communication signals, including known communication technologies, devices, transmission media, and protocols supportive of remote data communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, radio frequency ("RF") signaling technologies, wireless communication technologies (e.g., Bluetooth, Wi-Fi, etc.), optical transport and signaling technologies, live transmission technologies (e.g., media streaming technologies), media file transfer technologies, in-band and out-of-band signaling technologies, and other suitable communications technologies.

Network 106 may include one or more networks or types of networks (and communication links thereto) capable of carrying communications, media content, and/or data signals between media content delivery subsystem 102 and end-user media content processing subsystem 104. For example, network 106 may include, but is not limited to, one or more wireless networks (e.g., satellite media broadcasting networks or terrestrial broadcasting networks), mobile telephone networks (e.g., cellular telephone networks), closed media networks, open media networks, subscriber television networks (e.g., broadcast, multicast, and/or narrowcast television networks), closed communication networks, open communication networks, satellite networks, cable networks, hybrid fiber coax networks, optical fiber networks, broadband networks, narrowband networks, the Internet, wide area networks, local area networks, public networks, private networks, packet-switched networks, and any other networks capable of carrying data and/or communications signals between end-user media content processing subsystem 104 and media content delivery subsystem 102. Communications between media content delivery subsystem 102 and end-user media content processing subsystem 104 may be transported using any one of above-listed networks, or any combination or sub-combination of the above-listed networks. In certain embodiments, network 106 comprises a subscriber television network configured to transport live transmissions and other transmission (e.g., non-live transfers) of media content from media content delivery subsystem 102 to end-user media content processing subsystem 104.

End-user media content processing subsystem 104 may include or be implemented in one or more end-user media content processing devices configured to communicate with media content delivery subsystem 102 via network 106. An end-user media content processing device may be associated with one or more end users and may be located at the premises of one or more end users (e.g., at a home of a subscriber).

Figure 2:
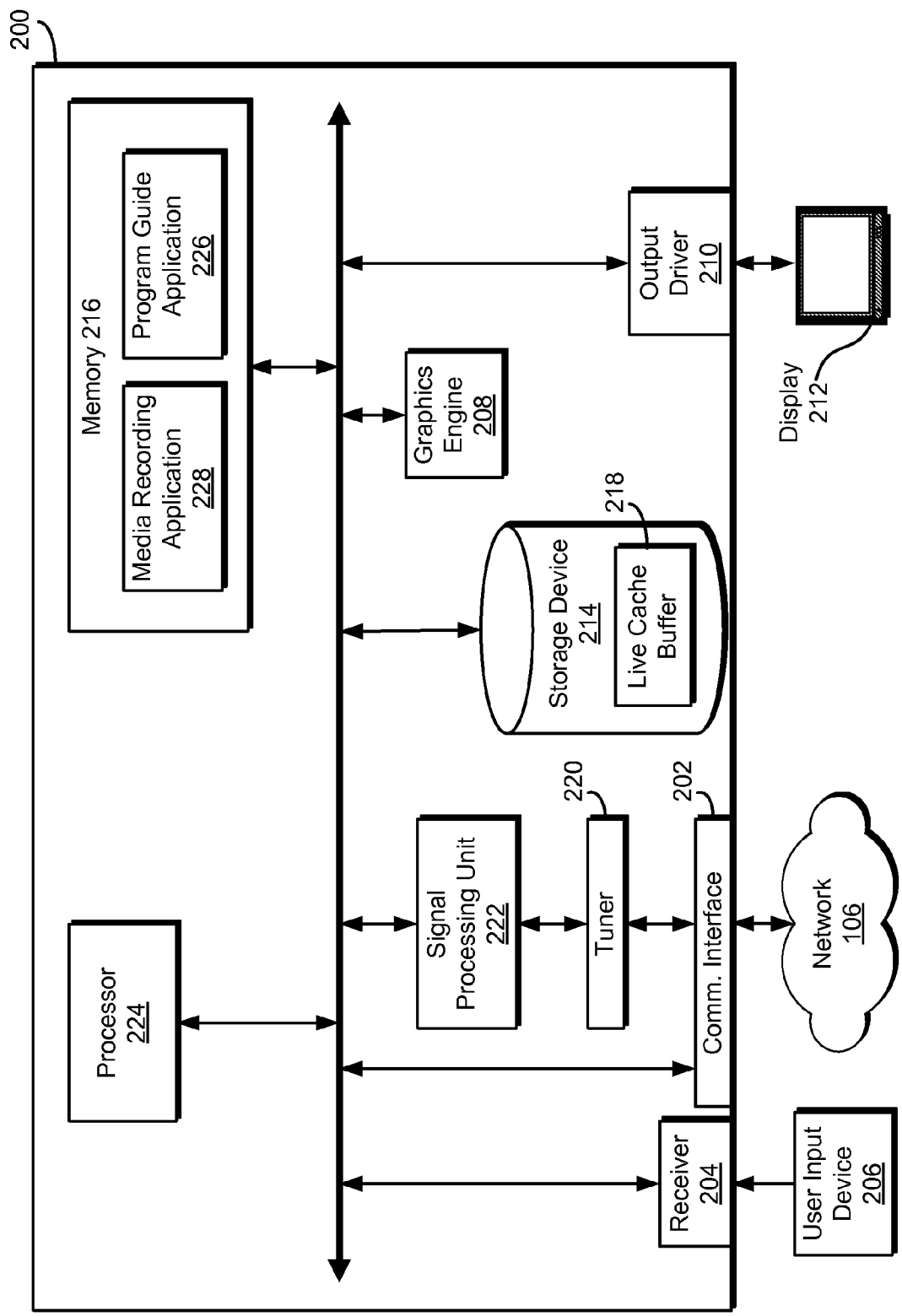
FIG. 2 illustrates an exemplary end-user media content processing device.

FIG. 2 illustrates an exemplary end-user media content processing device 200 (or simply "processing device 200"). Processing device 200 may include any computing device configured to communicate with media content delivery subsystem 102 and to receive and process media content as described herein. Processing device 200 may include, without limitation, a set-top box, media recording device (e.g., a digital video recording ("DVR") or personal video recording ("PVR") device), television device, phone device, mobile phone device, handheld device, personal computer, personal-digital assistant device, gaming device, entertainment device, and/or any device or combination of devices configured to perform one or more of the processes and/or operations described herein. In certain exemplary embodiments, processing device 200 includes a set-top box configured to access a media service and/or media content provided by media content delivery subsystem 102. For example, processing device 200 may include a set-top box configured to access at least one of a broadcast television service, a multicast television service, and a narrowcast television service over network 106.

Exemplary components of processing device 200 will now be described. While FIG. 2 illustrates exemplary components of processing device 200, the components illustrated in FIG. 2 are not intended to be limiting. Additional or alternative components may be used in other embodiments.

As shown in FIG. 2, processing device 200 may include a communication interface 202 configured to send and receive communication signals over network 106, including receiving content and/or data (e.g., streaming media content, program guide data, media content metadata, media data files) in any acceptable format from media content delivery subsystem 102 or from any other suitable external source via network 106. Communication interface 202 may include any device, logic, and/or other technologies suitable for receiving signals and/or data representative of media content and/or other types of content or data. In certain embodiments, communication interface 202 may be configured to receive one or more live transmissions of media content and/or one or more non-live transmissions (e.g., media data file transfers) of network-recorded live transmissions of media content from media content delivery subsystem 102 via network 106.

Processing device 200 may include a receiver 204 configured to receive user input signals from a user input device 206. User input device 206 may include, for example, a remote control device or any other suitable input device and may be configured to communicate with receiver 204 via a wireless link, electrical connection, or any other suitable communication link. User input device 206 may include one or more input mechanisms by which a user may utilize and/or control features and/or services provided by media content delivery subsystem 102 and/or processing device 200.

Processing device 200 may include a graphics engine 208 and an output driver 210. Graphics engine 208 may be configured to generate graphics to be provided to output driver 210, which may be configured to interface with or drive a display 212. Output driver 210 may provide output signals to display 212, the output signals including graphical content (e.g., visual media content) generated by graphics engine 208 and to be presented by display 212 for experiencing by a user. For example, output driver 210 may provide data representative of a graphical user interface ("GUI") including a media content presentation view to display 212 for presentation to the user. Visual media content may be played back in such a media content presentation view. Graphics engine 208 and output driver 210 may include any combination of hardware, software, and/or firmware as may serve a particular application.

Storage device 214 may include one or more data storage media, devices, or configurations and may employ any type, form, and combination of computer-readable storage media, including any of those mentioned herein. Media content, program guide data, media content metadata, and/or other data may be temporarily and/or permanently stored in storage device 214. For example, data representative of media content may be stored temporarily (e.g., buffered) and/or more permanently (e.g., recorded) for subsequent processing by the processing device 200.

Storage device 214 is shown to be a part of the processing device 200 for illustrative purposes only. It will be understood that storage device 214 may additionally or alternatively be located external of processing device 200 (e.g., in a DVR device in communication with processing device 200).

Processing device 200 may include memory 216, which may include, but is not limited to, FLASH memory, random access memory ("RAM"), dynamic RAM ("DRAM"), other suitable computer-readable media, or any combination or sub-combination thereof. In some examples, one or more software applications configured to run on processing device 200 may reside in memory 216.

Storage device 214 may include one or more live cache buffers 218. Live cache buffer 218 may additionally or alternatively reside in memory 216 or in a storage device external to processing device 200. In some examples, media content data may be temporarily stored in live cache buffer 218 to facilitate playing back and/or recording of media content being streamed in a live transmission from media content delivery subsystem 102 to processing device 200 via network 106.

Processing device 200 may include one or more tuners 220. Tuner 220 may be configured to selectively receive live transmissions of streaming media content carried on a particular content carrier channel such that the media content may be processed by processing device 200. In some examples, processing device 200 may include multiple tuners 220 such that live transmissions of streaming media content carried on different content carrier channels may be concurrently received for processing by processing device 200. For example, processing device 200 may include a first tuner configured to receive media content carried on an analog video signal and a second tuner configured to concurrently receive content carried on a digital compressed signal.

While one or more tuners 220 may be used to receive various types of content-carrying signals transmitted by media content delivery subsystem 102 (e.g., live transmissions of media content), additionally or alternatively, processing device 200 may be configured to receive other types of signals (e.g., other types of media content carrying signals) from media content delivery subsystem 102 and/or from one or more other sources without using a tuner 220. For example, media content delivery subsystem 102 may transmit digital streams of data packets (e.g., Internet Protocol ("IP") based data packets such as may be included in an IP television ("IPTV") data stream) in live transmissions that can be received without using a tuner 220. For such types of signals, communication interface 202 may receive and forward the signals directly to other components of processing device 200 (e.g., processor 224 and/or signal processing unit 222) without the signals going through a tuner 220. For an IP-based signal such as a live IPTV transmission signal, for example, signal processing unit 222 may function as an IP receiver. Accordingly, processing device 200 may be configured to receive one or more types of live transmissions, including IPTV, QAM, and video-on-demand broadcasts, multicasts, and/or narrowcasts.

Processing device 200 may also be configured to receive media content in other transmission formats. For example, communication interface 202 may be configured to receive data representative of media content (e.g., one or more media data files) in a non-live transmission for storage by processing device 200 to storage device 214. For example, communication interface 202 may receive media content by data file transfer from media content delivery subsystem 102 and store one or more data files representative of the media content to storage device 214 for subsequent access and playback.

Processing device 200 may include at least one processor, such as processor 224, configured to control and/or perform one or more operations of processing device 200. Processing device 200 may also include a signal processing unit 222 configured to process incoming media content and/or other signals. Signal processing unit 222 may be configured, for example, to demodulate and parse encoded digital media content. In some examples, processing device 200 may include one or more signal processing units 222 corresponding to each of the tuners 220.

As mentioned, processing device 200 may include one or more software applications residing in memory 216 or another computer-readable medium and configured to be executed by processor 224 of processing device 200. In FIG. 2, processing device 200 includes a program guide application 226 and a media recording application 228 residing in memory 216.

Program guide application 226 may be configured to perform or direct one or more other components of processing device 200 to perform one or more program guide operations. For example, program guide application 226 may direct one or more components of processing device 200 to generate and provide data representative of a program guide GUI to display 212 for presentation to a user. The program guide GUI may provide data representative of a media program guide and transmission schedule indicating content carrier channels on which live transmissions of media content are carried and time slots during which the live transmissions are available over network 106. Hence, the program guide GUI may assist a user of processing device 200 in identifying desirable media content and scheduled live transmissions of the media content. The program guide GUI may also assist a user of processing device 200 in initiating and/or scheduling recordings of live transmissions of media content.

Media recording application 228 may be configured to perform or direct one or more other components of processing device 200 to perform one or more local media recording operations. For example, media recording application 228 may direct one or more other components of processing device 200 to locally record a live transmission of a media content instance to storage device 214. Processing device 200 may subsequently utilize the locally stored recording to play back the media content instance for experiencing by a user of the processing device 200.

Media recording application 228 may also maintain or direct one or more other components of processing device 200 to maintain data representative of one or more local recording schedules specifying scheduled time slots and channels of live transmissions to be locally recorded by processing device 200. As an example, media recording application 228 may direct one or more components of processing device 200 to generate and provide a recording schedule GUI to display 212 for presentation to a user. A user of processing device 200 may utilize the recording schedule GUI and/or a program guide GUI to schedule local recordings of one or more live transmissions of media content instances. Media recording application 228 may initiate local media recording operations based on the local recording schedule. Media recording application 228 may also be configured to initiate local media recording operations in response to user input directing processing device 200 to initiate a recording.

Alternative or in addition to initiating and/or performing local media recording operations, media recording application 228 may be configured to perform or direct one or more other components of processing device 200 to facilitate and/or access network media recording operations and/or services. For example, processing device 200 may request that a live transmission of a media content instance be recorded by media content delivery subsystem 102. To this end, media recording application 228 may direct one or more components of processing device 200 to generate and transmit a request to record a live transmission of a media content instance to media content delivery subsystem 102 via network 106. Media recording application 228 may initiate the sending of such a request in response to an occurrence of any predetermined event, including, but not limited to, user input directing processing device 200 to request a network recording of a media content instance, user input scheduling a recording of a live transmission of a media content instance, and/or a predicted shortage of resources for one or more recordings (e.g., processing device 200 predicts a lack of processing device resources to process scheduled recordings of overlapping live transmissions of media content).

Figure 3:
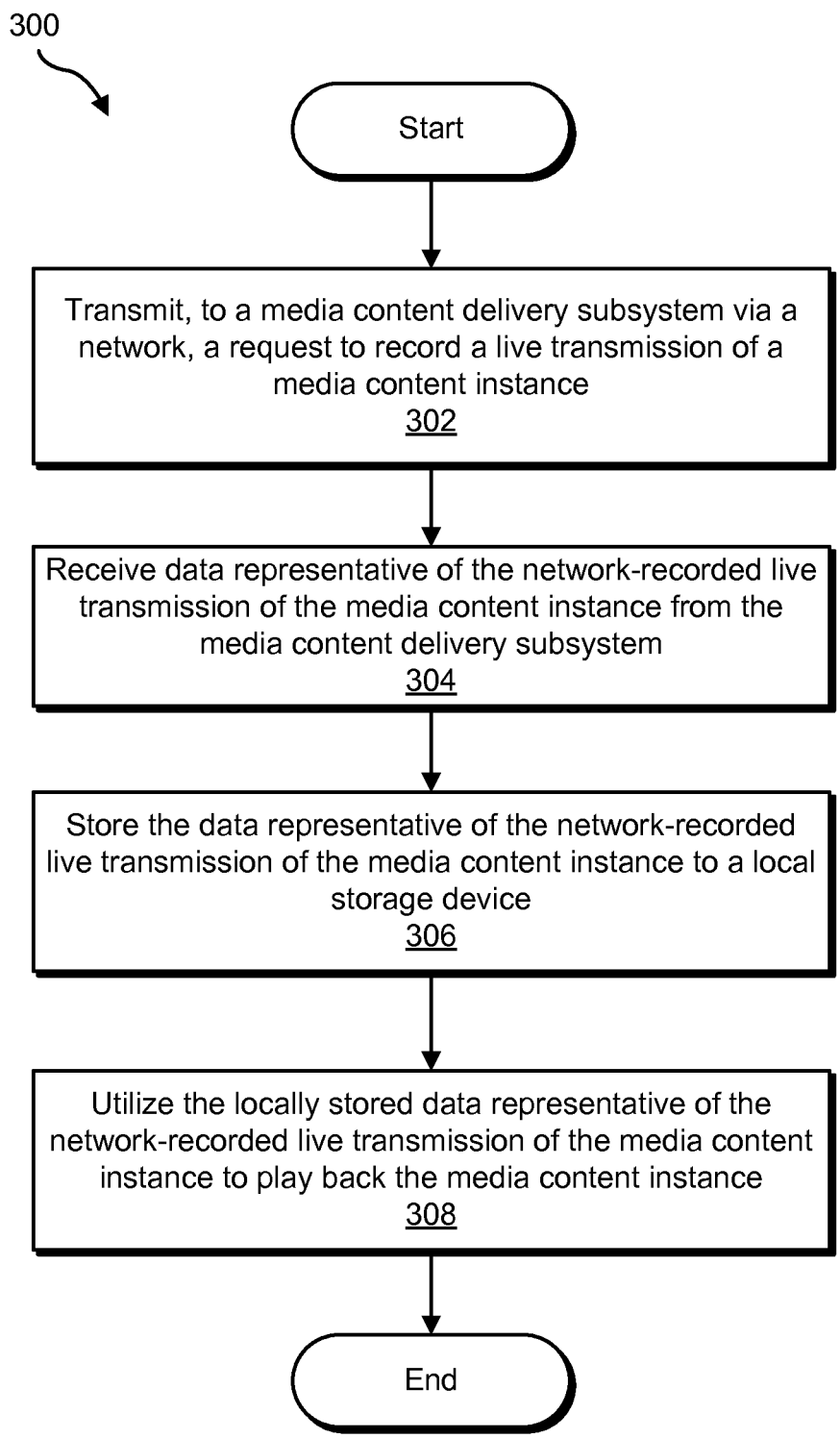
FIG. 3 illustrates an exemplary network recording access method.

FIG. 3 illustrates an exemplary network recording access method 300. While FIG. 3 illustrates exemplary steps according to one embodiment, other embodiments may omit, add to, reorder, and/or modify any of the steps shown in FIG. 3. In certain embodiments, one or more of the steps shown in FIG. 3 may be performed by end-user media content processing subsystem 104 and/or processing device 200.

At step 302, a request to record a live transmission of a media content instance is transmitted to media content delivery subsystem 102 via network 106. For example, end-user media content processing subsystem 104 and/or processing device 200 may transmit a request to record a live transmission of a media content instance to media content delivery subsystem 102 via network 106. The request may include data indicating the live transmission to be recorded, which data may include, without limitation, a content channel identifier and time slot associated with the live transmission. In certain examples, the request may include a specific request to record a live transmission. In other examples, the request may comprise a recording schedule indicating one or more scheduled recordings of one or more live transmissions of media content. For example, end-user media content processing subsystem 104 may transmit data representative of at least a portion of a local recording schedule to media content delivery subsystem 102 to request one or more network recordings of one or more live transmissions of media content.

As described in more detail further below, media content delivery subsystem 102 may perform one or more network recordings of one or more live transmissions of media content and provide data representative of the network-recorded media content in response to one or more network recording requests transmitted to media content delivery subsystem 102 at step 302.

At step 304, data representative of the network-recorded live transmission of the media content instance requested at step 302 is received from media content delivery subsystem 102. For example, end-user media content processing subsystem 104 and/or processing device 200 may receive data representative of the network-recorded live transmission of the media content instance from media content delivery subsystem 102. The data representative of the network-recorded live transmission of the media content instance may be received in any suitable format by end-user media content processing subsystem 104, including in a non-live transmission format that may generally utilize less resources to receive than would be used when receiving a live transmission of the media content instance. In certain embodiments, for example, the data is received in a non-live transmission format such as a transfer of one or more media data files from media content delivery subsystem 102 to end-user media content processing subsystem 104 and/or processing device 200.

At step 306, the data representative of the network-recorded live transmission of the media content instance is stored to a local storage device. For example, end-user media content processing subsystem 104 and/or processing device 200 may store the data representative of the network-recorded live transmission of the media content instance received at step 304 to a local storage device such as storage device 214. The data may be stored in a manner such that it may be subsequently accessed and used for play back of the media content instance by end-user media content processing subsystem 104 and/or processing device 200. In certain embodiments, the storing at step 360 includes storing a download of a complete media data file including the data representative of the network-recorded live transmission of the media content instance to a local storage device before playback of the media content instance may be initiated.

At step 308, the locally stored data representative of the network-recorded live transmission of the media content instance is utilized to play back the media content instance. For example, end-user media content processing subsystem 104 and/or processing device 200 may access and use the locally stored data representative of the network-recorded live transmission of the media content instance to play back at least a portion of the media content instance for experiencing by a user of end-user media content processing subsystem 104 and/or processing device 200. In certain embodiments, playback of the locally stored media content instance may be initiated only after a complete media data file is downloaded and stored at step 306.

In the above-described or similar manner, end-user media content processing subsystem 104 and/or processing device 200 may request that a network recording of media content be performed and receive, store, and utilize the network-recorded media content for subsequent playback.

The exemplary network recording access method 300 of FIG. 3 may be used to expand the capacity of processing device 200 to receive media content carried in concurrent and/or overlapping live transmissions (e.g., live transmissions associated with overlapping and/or concurrent time slots) provided by media content delivery subsystem 102 over network 106. For example, when multiple overlapping live transmissions of media content are transmitted by media content delivery subsystem 102 over network 106, processing device 200 may receive a subset of the multiple overlapping live transmissions in live transmission format and may execute one or more steps of method 300 to request and receive data representative of another subset of the multiple overlapping live transmissions in a non-live transmission format as described above. For instance, if processing device 200 includes a single tuner 220, the single tuner 220 may be used to receive one of the concurrent live transmissions of media content in a live transmission format. Processing device 200 may also execute one or more steps of method 300 to request and receive data representative of at least one other of the overlapping live transmissions in a non-live transmission format as described above. This may help processing device 200 avert potential tuner conflicts such as may be caused by over-scheduling of recordings of overlapping live transmissions of media content.

As an example of utilizing both local media content recording capabilities and a network media content recording service, in addition to executing the steps of method 300 described above to request, receive, and store data representative of a network-recorded live transmission of a media content instance, processing device 200 may receive and record a separate live transmission of another media content instance, even when the live transmission of the media content instance and the separate live transmission of the other media content instance are available via network 106 during overlapping time slots.

Figure 4:
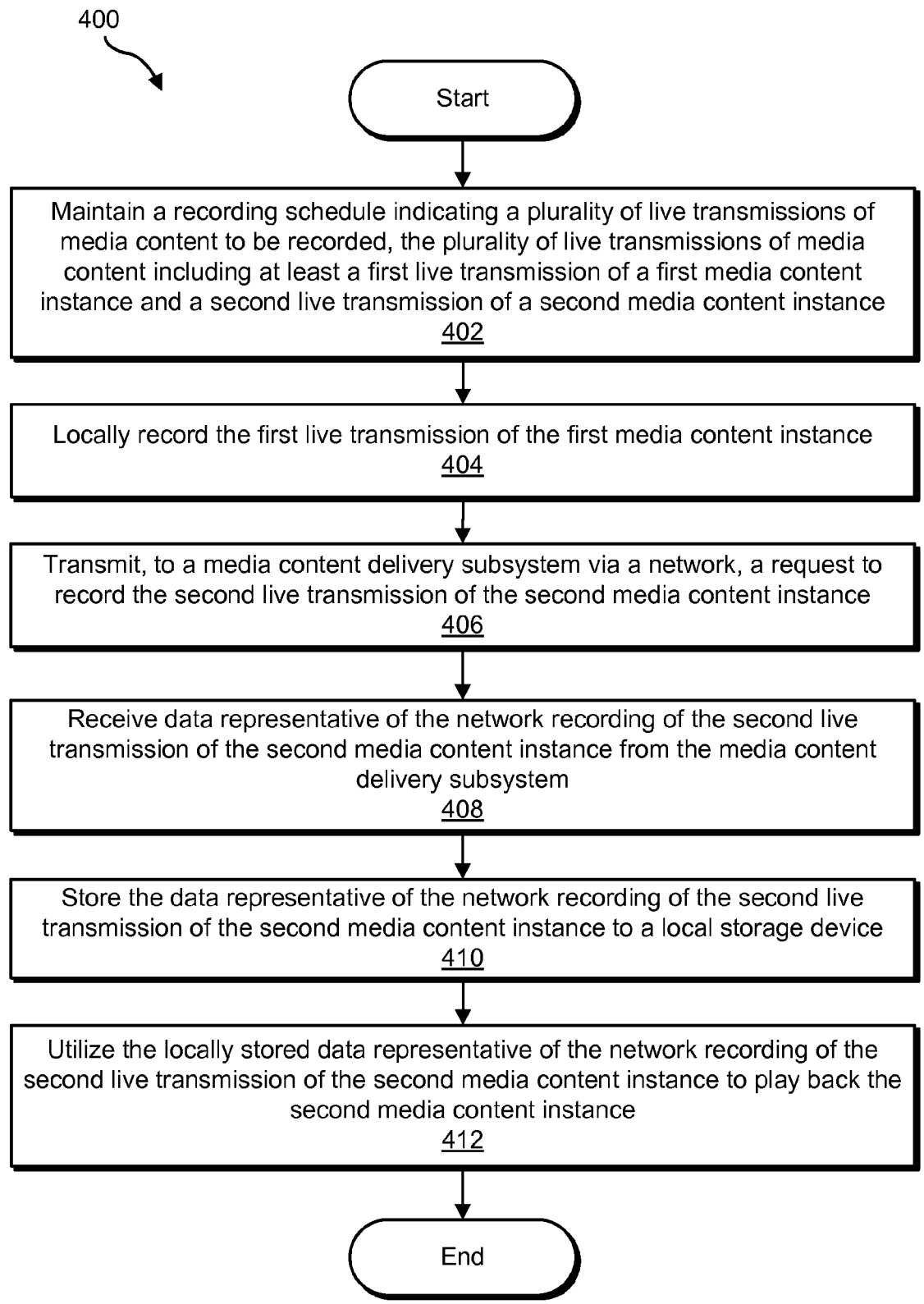
FIG. 4 illustrates an exemplary media content recording method utilizing the network recording access method of FIG. 3.

FIG. 4 illustrates an exemplary media content recording method 400 that utilize the network recording access method of FIG. 3. While FIG. 4 illustrates exemplary steps according to one embodiment, other embodiments may omit, add to, reorder, and/or modify any of the steps shown in FIG. 4. In certain embodiments, one or more of the steps shown in FIG. 4 may be performed by end-user media content processing subsystem 104 and/or processing device 200.

At step 402, a recording schedule indicating a plurality of live transmissions of media content to be recorded is maintained. For example, processing device 200 may maintain a local recording schedule indicating a plurality of live transmissions of media content to be recorded in storage device 214. In certain examples, the plurality of live transmissions of media content indicated in the recording schedule may include at least a first live transmission of a first media content instance and a second live transmission of a second media content instance.

At step 404, the first live transmission of the first media content instance is locally recorded. For example, processing device 200 may receive the first live transmission of the first media content instance in a live transmission format and locally record the first live transmission of the first media content instance, as described above.

At step 406, a request to record the second live transmission of the second media content instance is transmitted to media content delivery subsystem 102. For example, processing device 200 may transmit a request to record the second live transmission of the second media content instance to media content delivery subsystem 102, which may record the second live transmission of the second media content instance as described further below.

At step 408, data representative of a network recording of the second live transmission of the second media content instance requested at step 406 is received from media content delivery subsystem 102. For example, processing device 200 may receive data representative of the network recording of the second live transmission of the second media content instance from media content delivery subsystem 102.

At step 410, the data representative of the network recording of the second live transmission of the second media content instance is stored to a local storage device. For example, processing device 200 may store the data representative of the network recording of the second live transmission of the second media content instance received at step 408 to storage device 214.

At step 412, the locally stored data representative of the network recording of the second live transmission of the second media content instance is utilized to play back the media content instance. For example, processing device 200 may access and use the locally stored data representative of the network recording of the second live transmission of the second media content instance to play back at least a portion of the second media content instance for experiencing by a user of processing device 200.

Figure 5:
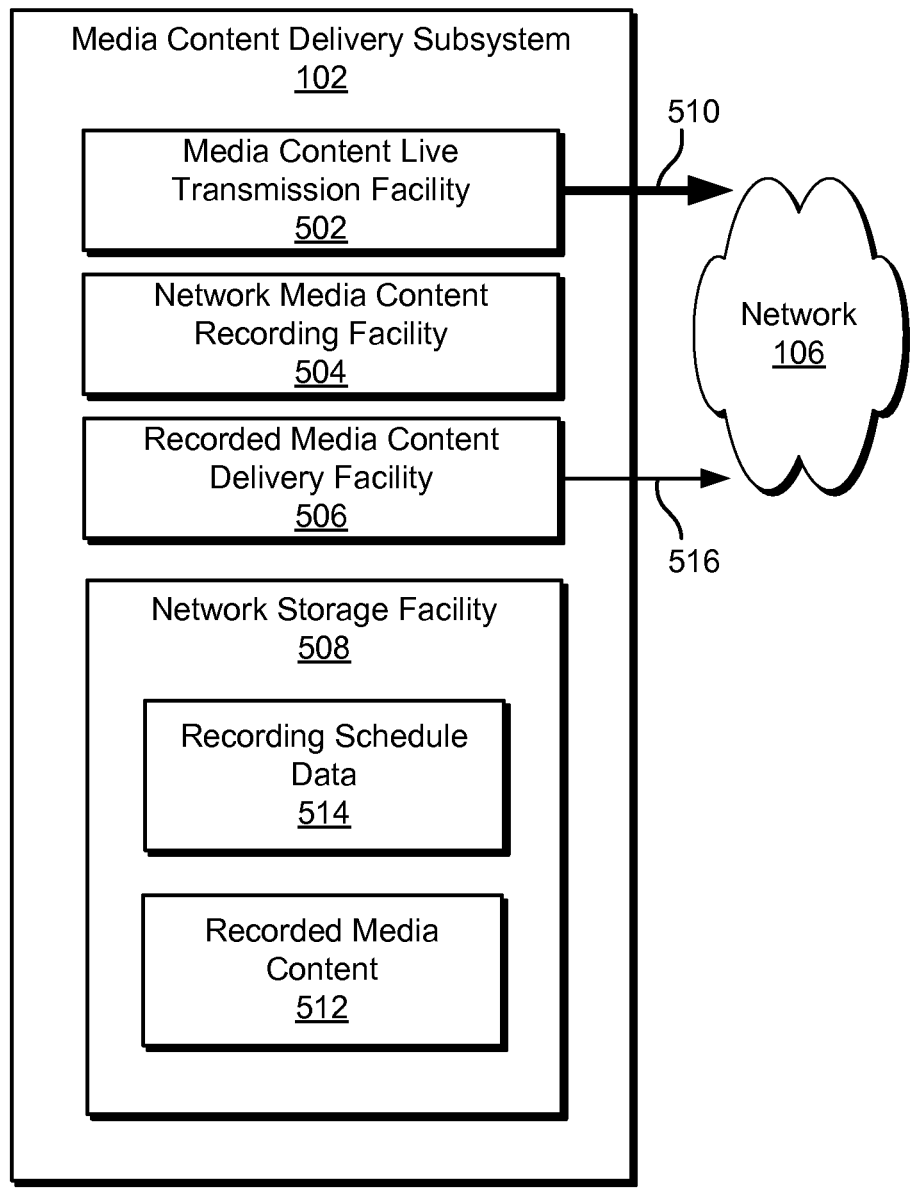
FIG. 5 illustrates exemplary components of a media content delivery subsystem.

Turning now to media content delivery subsystem 102, FIG. 5 illustrates exemplary components of media content delivery subsystem 102. As shown in FIG. 5, media content delivery subsystem 102 may include a media content live transmission facility 502, media content recording facility 504, recorded media content delivery facility 506, and network storage facility 508, which may be in communication with one another using any suitable communication technologies.

Media content live transmission facility 502 may be configured to transmit one or more live transmissions of media content over network 106. An exemplary live transmission transmitted by media content live transmission facility 502 over network 106 is represented as arrow 510 in FIG. 5. In certain embodiments, media content live transmission facility 502 may transmit live transmissions of media content over network 106 in accordance with a transmission schedule specifying time slots during which live transmissions are to be transmitted and content carrier channels to be used to carry the media content associated with the live transmissions. Additionally or alternatively, in certain embodiments, media content live transmission facility 502 may transmit live transmissions of media content in response to occurrences of predefined events, including, for example, receipt of requests from end-user media content processing subsystem 104 for live transmissions of media content (e.g., requests for video-on-demand content).

Live transmissions of media content transmitted by media content live transmission facility 502 may include broadcast, multicast, and/or narrowcast live transmissions of media content. For example, media content live transmission facility 502 may broadcast and/or multicast one or more television programs over network 106 in accordance with a television broadcast and/or multicast schedule. As another example, media content live transmission facility 502 may narrowcast one or more television programs over network 106 in response to requests for the television programs.

Network media content recording facility 504 may be configured to record live transmissions of media content, including live transmissions of media content transmitted by media content live transmission facility 502. Network media content recording facility 504 may record live transmissions of media content in real time while media content live transmission facility 502 transmits the live transmissions.

Network media content recording facility 504 may cause recorded live transmissions of media content to be stored in network storage facility 508 as recorded media content 512. The recorded media content 512 may be stored in any suitable format(s), including as one or more media data files and/or libraries.

Network media content recording facility 504 may be configured to initiate a recording of a live transmission of media content in response to a predefined recording event. In certain embodiments, for example, network media content recording facility 504 may initiate a recording of a live transmission of media content in response to a request to record the live transmission of media content, including a request received from end-user media content processing subsystem 104. End-user media content processing subsystem 104 may transmit the request to media content delivery subsystem 102 via network 106 as described above and may include any of the data described above.

In certain embodiments, a request to record one or more live transmissions of media content may comprise a recording schedule received from end-user media content processing subsystem 104. Network media content recording facility 504 may store data representative of one or more such recording schedules in network storage facility 508 as recording schedule data 514. Network media content recording facility 504 may utilize recording schedule data to determine when to start and stop network recording sessions in order to record live transmissions of media content during appropriate time slots and on appropriate content carrier channels.

Recorded media content delivery facility 506 may be configured to transmit data representative of recorded media content 512 to end-user media content processing subsystem 104 via network 106. An exemplary transmission of a recorded media content instance by recorded media content delivery facility 506 over network 106 is represented as arrow 516 in FIG. 5.

Recorded media content delivery facility 506 may be configured to transmit data representative of recorded media content 412 in any suitable non-live transmission format, including any non-live transmission format that may generally utilize less resources of network 106 and/or end-user media content processing subsystem 104 than would be utilized by a live transmission of media content transmitted by media content live transmission facility 502 over network 106. In certain embodiments, for example, recorded media content delivery facility 506 may be configured to initiate a file transfer of one or more media data files from media content delivery subsystem 102 to end-user media content processing subsystem 104 via network 106. In certain examples, such a file transfer of a media content instance may utilize less network bandwidth than would a live transmission of the media content instance by media content live transmission facility 502 over network 106.

As an example, a live transmission 510 of a media content instance in a high-definition Moving Pictures Expert Group format ("HD MPEG-2") may be transmitted by media content live transmission facility 502 over network 106 at a rate of nineteen megabits per second (19 Mbps) to support live, real time play back of the media content instance by end-user media content processing subsystem 104. In contrast, a non-live transmission 516 (e.g., a file transfer) of data representative of the recorded live transmission of the media content instance may be transmitted by recorded media content delivery facility 506 over network 106 to end-user media content processing subsystem 104 at a relatively lower transmission rate, thereby conserving network bandwidth. In certain examples, the transfer rate of data representative of the recorded media content instance may be significantly lower than the rate of the live transmission of the media content instance. In certain examples, the transfer rate for transferring data representative of the recorded media content instance may be dynamically adjusted (e.g., throttled) by recorded media content delivery facility 506 based on network bandwidth available at the time of transfer.

Recorded media content delivery facility 506 may be configured to transmit recorded media content 512 over network 106 at any suitable time. In certain embodiments, for example, recorded media content delivery facility 506 may be configured to automatically initiate transfer of data representative of a recorded media content instance after completion of the network recording of the live transmission of the media content instance by network media content recording facility 504. As another example, in certain embodiments, recorded media content delivery facility 506 may be configured to automatically initiate transfer of data representative of a recorded media content instance at a non-peak network usage time. For instance, recorded media content delivery facility 506 may automatically transfer any media content recorded during a day by network media content recording facility 504 at an off-peak time after the end of the day (e.g., late at night) when network bandwidth usage is relatively low.

As yet another example, recorded media content delivery facility 506 may be configured to automatically initiate a transfer of data representative of a recorded media content instance based on an operating attribute of processing device 200. To this end, recorded media content delivery facility 506 may be configured to communicate with processing device 200 via network 106 to determine one or more operating attributes of processing device 200. When an operating attribute indicates a particular predefined operating status of processing device 200, recorded media content delivery facility 506 may transfer data representative of a recorded media content instance to processing device 200. For example, a transfer may be automatically initiated by recorded media content delivery facility 506 when an operating attribute of processing device 200 indicates that processing device 200 is powered off, is in a stand-by mode, is not currently recording a live transmission of media content, or is otherwise using relatively minimal resources.

Hence, in any of the ways described above, recorded media content delivery facility 506 may be configured to "trickle down" data representative of network-recorded live transmissions of media content to one or more processing devices 200 of end-user media content processing subsystem 104 via network 106 in a way that may generally conserve resources of network 106.

In some examples, recorded media content delivery facility 506 may be configured to automatically remove recorded media content 512 from network storage facility 508 after the recorded media content 512 has been successfully transmitted to end-user media content processing subsystem 104. The removal, which may be accomplished in any suitable way, may also help conserve network resources, particularly network data storage resources.

The "trickle down" of data representative of network-recorded live transmission of media content may also help conserve resources of end-user media content processing subsystem 104. For example, as described above, processing device 200 may receive data representative of network-recorded media content transmitted by recorded media content delivery facility 506 over network 106 without using a tuner 220. Accordingly, the tuner 220 is freed up to receive another live transmission of media content transmitted by media content live transmission facility 502. Hence, tuner conflicts (e.g., tuner conflicts caused by over-scheduling media content recordings) may be minimized or eliminated, and a user may be able to schedule multiple network recordings of live transmissions of media content and have the network-recorded media content "trickled down" to processing device 200 as described above.

Figure 6:
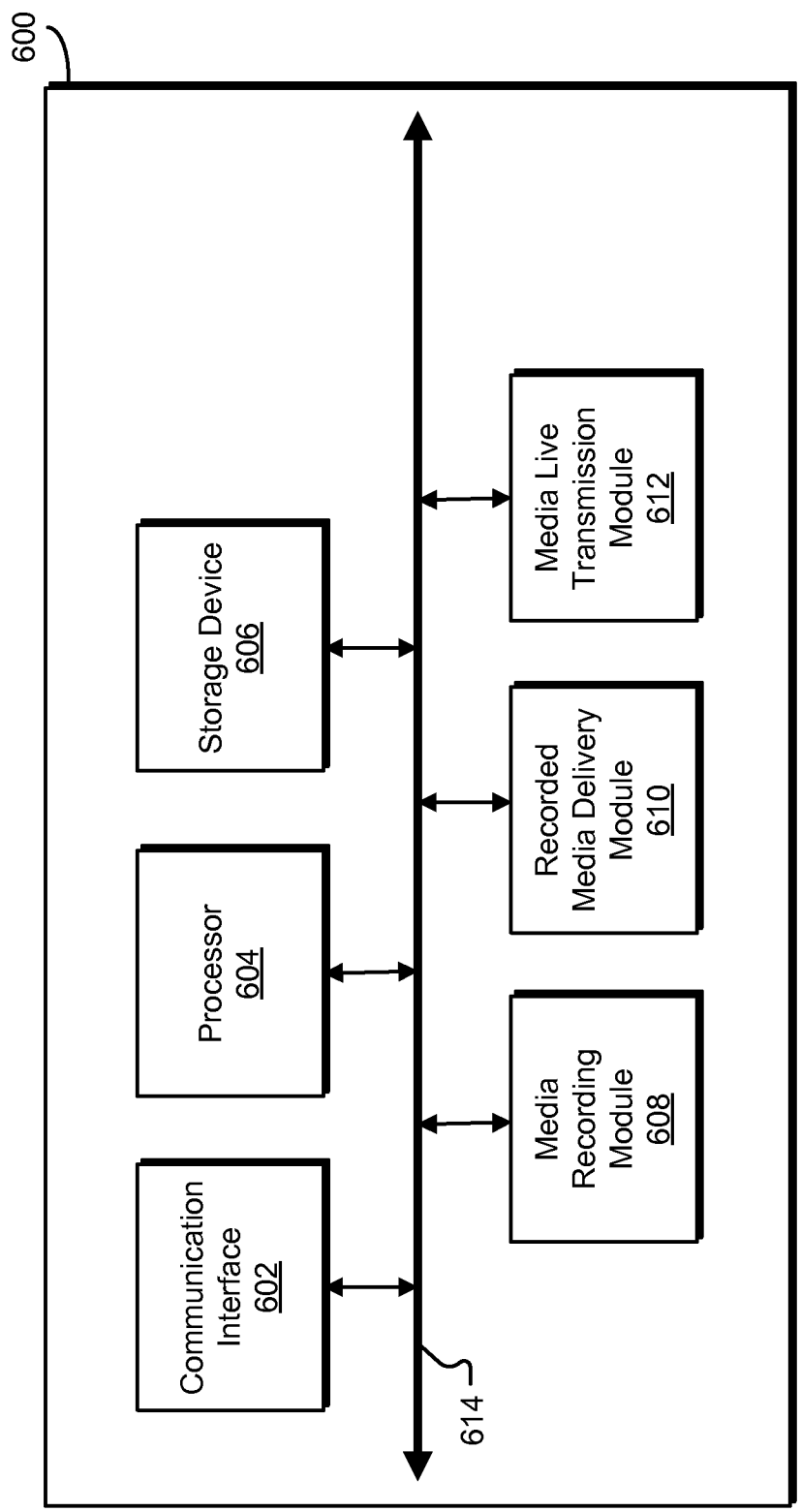
FIG. 6 illustrates an exemplary network computing device.

One or more components of media content delivery subsystem 102 may include or be implemented in one or more network computing devices. For example, FIG. 6 illustrates an exemplary network computing device 600 having components of media content delivery subsystem 102 implemented therein. Network computing device 600 may include any suitable computing device configured to execute one or more operations of media content delivery subsystem 102, including communicating with end-user media content processing subsystem 104 via network 106. For example, network computing device 600 may include a server device (e.g., a media server, application server, or video server).

As shown in FIG. 6, network computing device 600 may include a communication interface 602, processor 604, storage device 606, media recording module 608, recorded media delivery module 610, and media live transmission module 612 coupled to one another by a communication infrastructure 614. The components of system 100 may communicate with one another, including sending data to and receiving data from one another by way of a communication infrastructure 614, using any suitable communication technologies.

Communication interface 602 may be configured to communicate with one or more external computing devices, including one or more processing devices 200 of end-user media content processing subsystem 104. In particular, communication interface 602 may be configured to transmit and/or receive communication signals, media content, and/or data to/from end-user media content processing subsystem 104. In certain embodiments, communication interface 602 may be configured to transmit and receive live transmissions of media content (e.g., broadcasts, multicasts, and/or narrowcasts of streaming media content) and non-live transmissions of media content (e.g., media data file transfers).

Processor 604 generally represents any type or form of processing unit capable of processing data or interpreting, executing, and/or directing execution of one or more of the instructions, processes, and/or operations described herein. Processor 604 may direct execution of operations in accordance with computer-executable instructions such as may be stored in storage device 606 or another computer-readable medium. As an example, processor 604 may be configured to process data, including modulating, encoding, and/or otherwise preparing data (e.g., media content data) for transmission by communication interface 602.

Storage device 606 may include one or more data storage media, devices, or configurations and may employ any type, form, and combination of data storage media and/or device. For example, storage device 606 may include, but is not limited to, a hard drive, network drive, flash drive, magnetic disc, optical disc, RAM, DRAM, other non-volatile and/or volatile data storage units, or a combination or sub-combination thereof. Electronic data, including data described herein, may be temporarily and/or permanently stored in storage device 606. Data representative of one or more executable applications or other computer-executable instructions configured to direct processor 604 to perform one or more of the operations described herein may be stored within storage device 606. In some examples, data may be arranged in one or more databases residing within storage device 606.

Media recording module 608, recorded media delivery module 610, and media live transmission module 612 may be configured to perform one or more of the above-described operations of network media content recording facility 504, recorded media content delivery facility 506, and media content live transmission facility 502, respectively. In certain embodiments, media recording module 608, recorded media delivery module 610, and media live transmission module 612 may be implemented as computer-executable instructions stored in storage device 606 and configured to direct processor 604 and/or other components of network computing device 600 to perform such operations.

Figure 7:
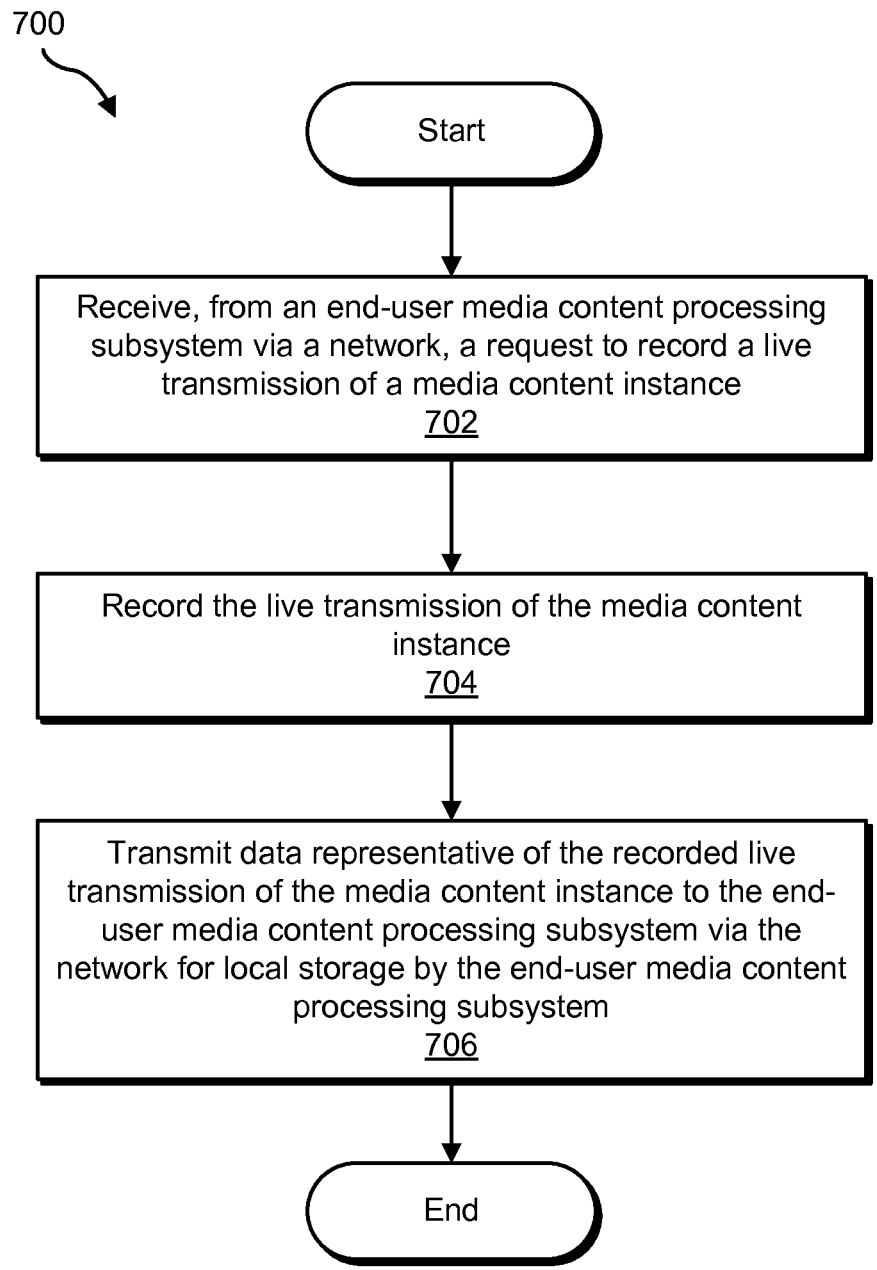
FIG. 7 illustrates an exemplary media content delivery method.

FIG. 7 illustrates an exemplary media content delivery method 700. While FIG. 7 illustrates exemplary steps according to one embodiment, other embodiments may omit, add to, reorder, and/or modify any of the steps shown in FIG. 7. In certain embodiments, one or more of the steps shown in FIG.

7 are performed by media content delivery subsystem 102 and/or network computing device 600.

At step 702, a request to record a live transmission of a media content instance is received from end-user media content processing device 200 via network 106. For example, media content delivery subsystem 102 may receive a request to record a live transmission of a media content instance from end-user media content processing device 200 via network 106 in any of the ways described above. The request may be in any format suitable for requesting a network recording and indicating the live transmission to be recorded, as described above.

At step 704, the live transmission of the media content instance is recorded. For example, media content delivery subsystem 102 may receive and record the live transmission of the media content instance in any of the ways described above. This network recording of the live transmission of the media content instance may include storing data representative of the recorded live transmission of the media content instance to a network data store (e.g., network storage facility 508). For example, media content delivery subsystem 102 may generate at least one media data file containing the data representative of the recorded live transmission of the media content instance.

At step 706, data representative of the recorded live transmission of the media content instance is transmitted to the end-user media content processing device 200 via network 106 for local storage by the end-user media content processing device 200. For example, media content delivery subsystem 102 may transmit data representative of the recorded live transmission of the media content instance to the end-user media content processing device 200 via network 106 in any of the ways described above. For instance, at least one media data file containing the data representative of the recorded live transmission of the media content instance may be transferred from media content delivery subsystem 102 to the end-user media content processing device 200 via network 106. As described above, in certain examples, transmitting of the data representative of the recorded live transmission of the media content instance to the end-user media content processing device 200 via network 106 may include dynamically adjusting a rate of transfer based on available network bandwidth. As also described above, transmitting of the data representative of the recorded live transmission of the media content instance to the end-user media content processing device 200 via network 106 may utilize less resources of network 106 than the live transmission of the media content instance. End-user media content processing device 200 may receive, store, and utilize the data representative of the recorded live transmission of the media content instance in any of the ways described above.

The preceding description has been presented only to illustrate and describe exemplary embodiments with reference to the accompanying drawings. It will, however, be evident that various modifications and changes may be made thereto, and additional embodiments may be implemented, without departing from the scope of the invention as set forth in the claims that follow. The above description and accompanying drawings are accordingly to be regarded in an illustrative rather than a restrictive sense.

What is claimed is:

1. A method comprising:
receiving, by a media content delivery subsystem from an end-user media content processing device via a network, a request to record a live transmission of a media content instance;
recording, by said media content delivery subsystem, said live transmission of said media content instance, said recording comprising generating at least one media data file containing data representative of said recorded live transmission of said media content instance;
determining, by said media content delivery subsystem, that a current operating status of said end-user content processing device matches a predefined operating status;
transmitting, by said media content delivery subsystem in response to said determining that said current operating status of said end-user media content processing device matches said predefined operating status, said data representative of said recorded live transmission of said media content instance to said end-user media content processing device via said network for local storage by said end-user media content processing device, said transmitting comprising transferring said at least one media data file from said media content delivery subsystem to said end-user media content processing device via said network, said transferring of said at least one media data file performed in a manner that enables said end-user media content processing device to play back at least a portion of said at least one media data file only after all of said at least one media data file is transferred to said end-user media content processing device;
dynamically adjusting a rate of said transferring of said at least one media data file from said media content delivery subsystem to said end-user media content processing device via said network based on available network bandwidth; and
maintaining, by said media content delivery subsystem while dynamically adjusting said rate of said transferring of said at least one media data file, a substantially unchanging level of quality of said recorded live transmission across said transfer of said at least one media data file from said media content delivery subsystem to said end-user media content processing device.

2. The method of claim 1, wherein said transmitting of said data representative of said recorded live transmission of said media content instance to said end-user media content processing device utilizes less resources of said network than said live transmission of said media content instance.

3. The method of claim 2, wherein said resources comprise a bandwidth of said network.

4. The method of claim 1, wherein said transmitting comprises automatically initiating a transfer of said data representative of said recorded live transmission of said media content instance from said media content delivery subsystem to said end-user media content processing device via said network at a non-peak network usage time.

5. The method of claim 1, wherein:
said request comprises data representative of at least a portion of a recording schedule associated with said end-user media content processing device; and
said recording comprises initiating said recording at a scheduled time of said live transmission based on said data representative of said at least a portion of said recording schedule.

6. The method of claim 1, wherein said recording comprises storing said recorded live transmission of said media content instance to a network storage facility, the method further comprising:
automatically removing, by said media content delivery subsystem, said recorded live transmission of said media content instance from said network storage facility after said transmitting of said data representative of said recorded live transmission of said media content instance to said end-user media content processing device via said network.

7. The method of claim 1, further comprising:
receiving, by said end-user media content processing device, said data representative of said recorded live transmission of said media content instance;
storing, by said end-user media content processing device, said data representative of said recorded live transmission of said media content instance to a local storage device; and
utilizing said data representative of said recorded live transmission of said media content instance in said local storage device to play back at least a portion of said media content instance for experiencing by a user.

8. The method of claim 1, wherein said live transmission of said media content instance comprises at least one of a broadcast and a multicast of said media content instance over said network by said media content delivery subsystem.

9. The method of claim 1, tangibly embodied as computer-executable instructions on at least one non-transitory computer-readable medium.

10. The method of claim 1, wherein said current operating status of said end-user media content processing device comprises a state in which said end-user media content processing device is currently powered off.

11. The method of claim 1, wherein said current operating status of said end-user media content processing device comprises a state in which said end-user media content processing device is currently in a stand-by mode.

12. The method of claim 1, wherein said current operating status of said end-user media content processing device comprises a state in which said end-user media content processing device is currently not recording any live transmission of media content.

13. A method comprising:
transmitting, by an end-user media content processing device to a media content delivery subsystem via a network, a request to record a live transmission of a media content instance over said network;
communicating, by said end-user media content processing device to said media content delivery subsystem via said network, an indication of a current operating status of said end-user media content processing device;
receiving, by said end-user media content processing device in response to said request and a determination that said current operating status of said end-user media content processing device matches a predefined operating status, data representative of a network-recorded live transmission of said media content instance, wherein said receiving is
performed at a receiving rate that is dynamically adjusted based on available network bandwidth;
performed in a manner that facilitates maintaining a substantially unchanging level of quality of said network-recorded live transmission while said receiving rate is dynamically adjusted based on said available network bandwidth; and
performed in a manner that enables said end-user media content processing device to play back at least a portion of said media content instance only after all of said data representative of said network-recorded live transmission is received by said end-user media content processing device;
storing, by said end-user media content processing device, said data representative of said network-recorded live transmission of said media content instance to a local storage device; and
utilizing said data representative of said network-recorded live transmission of said media content instance in said local storage device to play back said at least a portion of said media content instance for experiencing by said a user.

14. The method of claim 13, further comprising:
receiving, by said end-user media content processing device, a separate live transmission of another media content instance;
wherein said live transmission of said media content instance and said separate live transmission of said another media content instance are available via said network during overlapping time slots.

15. The method of claim 14, wherein said receiving of said data representative of said network-recorded live transmission of said media content instance by said end-user media content processing device utilizes less resources than said receiving of said separate live transmission of said another media content instance by said end-user media content processing device.

16. The method of claim 13, wherein:
said storing comprises storing a download of a complete media data file including said data representative of said network-recorded live transmission of said media content instance to said local storage device; and
said storing of said download of said complete media data file is completed before said playback of said at least a portion of said media content instance.

17. The method of claim 13, wherein said end-user media content processing device comprises a set-top box configured to access at least one of a broadcast television service, a multicast television service, and a narrowcast television service over said network.

18. A method comprising:
maintaining, by an end-user media content processing device, a recording schedule indicating a plurality of live transmissions of media content to be recorded, said plurality of live transmissions of media content including a first live transmission of a first media content instance and a second live transmission of a second media content instance scheduled for live transmission during overlapping time slots;
locally recording, by said end-user media content processing device, said first live transmission of said first media content instance;
transmitting, by said end-user media content processing device to a media content delivery subsystem via said network, a request to record said second live transmission of said second media content instance;
communicating, by said end-user media content processing device to said media content delivery subsystem via said network, an indication of a current operating status of said end-user media content processing device;
receiving, by said end-user media content processing device in response to said request and a determination that said current operating status of said end-user media content processing device matches a predefined operating status, data representative of a network recording of said second live transmission of said second media content instance, wherein said receiving is
performed at a receiving rate that is dynamically adjusted based on available network bandwidth;

performed in a manner that facilitates maintaining a substantially unchanging level of quality of said network-recorded live transmission while said receiving rate is dynamically adjusted based on said available network bandwidth; and performed in a manner that enables said end-user media content processing device to play back at least a portion of said second media content instance only after all of said data representative of said network recording of said second live transmission is received by said end-user media content processing device;

storing, by said end-user media content processing device, said data representative of said network recording of said second live transmission of said second media content instance to a local storage device; and utilizing said data representative of said network recording of said second live transmission of said second media content instance in said local storage device to play back said at least a portion of said second media content instance for experiencing by said a user.

19. A system comprising:

a media content live transmission facility configured to transmit a live transmission of a media content instance to at least one end-user media content processing device via a network in accordance with a live transmission format;

a network media content recording facility configured to
  receive a request from said at least one end-user media content processing device to record said live transmission of said media content instance, and
  record said live transmission of said media content instance in response to said request, including storing data representative of said recorded live transmission of said media content instance to a network storage facility; and a media content delivery facility configured to
  determine that a current operating status of said end-user content processing device matches a predefined operating status;
  transmit, in response to said determination that said current operating status of said end-user media content processing device matches said predefined operating status, data representative of said recorded live transmission of said media content instance to said at least one end-user media content processing device via said network in accordance with a non-live transmission format by transferring said data representative of said recorded live transmission of said media content instance in a manner that enables said at least one end-user media content processing device to play back at least a portion of said media content instance only after all of said data representative of said recorded live transmission is transferred to said at least one end-user media content processing device,
  dynamically adjust a rate of said transferring of said data representative of said recorded live transmission of said media content instance to said at least one end-user media content processing device via said network based on available network bandwidth, and
  maintain a substantially unchanging level of quality of said recorded live transmission across said transfer of said data representative of said recorded live transmission said data representative of said recorded live transmission while dynamically adjusting said rate of said transferring of said data representative of said recorded live transmission of said media content instance.

20. The system of claim 19, wherein said media content delivery facility is configured to transmit said data representative of said recorded live transmission of said media content instance to said at least one end-user media content processing device via said network by transfer of at least one media data file including said data representative of said recorded live transmission of said media content instance from said network storage facility to said at least one end-user media content processing device via said network.

21. The system of claim 19, wherein said media content delivery facility is configured to automatically initiate said transmitting of said data representative of said recorded live transmission of said media content instance to said at least one end-user media content processing device via said network at a non-peak network usage time.

* * * * *